United States Patent
Edwards

(10) Patent No.: US 10,041,025 B2
(45) Date of Patent: Aug. 7, 2018

(54) MULTI-CHAMBERED FLUID-FILLABLE APPARATUS

(75) Inventor: David Brian Edwards, Stevenage (GB)

(73) Assignee: EDWARDS INNOVATIONS LIMITED, Stevenage (GB)

( * ) Notice: Subject to any disclaimer, the term of this patent is extended or adjusted under 35 U.S.C. 154(b) by 280 days.

(21) Appl. No.: 12/737,218

(22) PCT Filed: Jun. 18, 2009

(86) PCT No.: PCT/GB2009/001545
§ 371 (c)(1),
(2), (4) Date: Feb. 28, 2011

(87) PCT Pub. No.: WO2009/153571
PCT Pub. Date: Dec. 23, 2009

(65) Prior Publication Data
US 2011/0139671 A1   Jun. 16, 2011

(30) Foreign Application Priority Data

Jun. 20, 2008 (GB) .................................. 0811399.5

(51) Int. Cl.
*B65D 81/02* (2006.01)
*B65D 85/00* (2006.01)
(Continued)

(52) U.S. Cl.
CPC .............. *C11D 17/045* (2013.01); *B32B 3/28* (2013.01); *B32B 7/12* (2013.01); *B32B 27/08* (2013.01);
(Continued)

(58) Field of Classification Search
CPC ....... C11D 17/045; C11D 17/043; B32B 7/12; B32B 3/28; B32B 27/306; B32B 27/08; B65D 65/466; B65D 81/052
(Continued)

(56) References Cited

U.S. PATENT DOCUMENTS 3,048,511 A * 8/1962 Strawinski .................... 428/511
3,207,420 A * 9/1965 Navarrete-Kindelan ....... 383/38
(Continued)

FOREIGN PATENT DOCUMENTS

CN   1401030 A   3/2003
EP   0236136 A2  9/1987
(Continued)

OTHER PUBLICATIONS

International Search Report dated Jan. 7, 2010 for PCT/GB2009/001545.
(Continued)

*Primary Examiner* — Rafael Ortiz
(74) *Attorney, Agent, or Firm* — Hamre, Schumann, Mueller & Larson, P.C.

(57) ABSTRACT

The invention relates to a multi-chambered, fluid-fillable apparatus, comprising two sheets bonded together to define a plurality of cells between them. In a first aspect, at least one, and preferably both, of the sheets are formed from polyvinyl alcohol. In a second aspect, the sheets are sealed together using both permanent and non-permanent seals. The non-permanent seals are formed to rupture at a predetermined internal pressure in order to dissipate externally applied load.

9 Claims, 9 Drawing Sheets

(51) Int. Cl.

| | | |
|---|---|---|
| *C11D 17/04* | (2006.01) | |
| *B32B 3/28* | (2006.01) | |
| *B65D 65/46* | (2006.01) | |
| *B65D 81/05* | (2006.01) | |
| *B32B 7/12* | (2006.01) | |
| *B32B 27/08* | (2006.01) | |
| *B32B 27/30* | (2006.01) | |

(52) U.S. Cl.
CPC ......... *B32B 27/306* (2013.01); *B65D 65/466* (2013.01); *B65D 81/052* (2013.01); *C11D 17/043* (2013.01); *B32B 2307/31* (2013.01); *B32B 2307/412* (2013.01); *B32B 2307/516* (2013.01); *B32B 2307/518* (2013.01); *B32B 2307/54* (2013.01); *B32B 2307/558* (2013.01); *B32B 2307/7163* (2013.01); *B32B 2307/7166* (2013.01); *B32B 2307/7244* (2013.01); *B32B 2307/7248* (2013.01); *B32B 2307/7265* (2013.01); *B32B 2439/80* (2013.01); *Y10T 156/10* (2015.01); *Y10T 428/13* (2015.01); *Y10T 428/24661* (2015.01); *Y10T 428/24777* (2015.01)

(58) Field of Classification Search
USPC ............... 206/522, 521, 591–594; 5/706; 229/68.1; 383/3; 1/522
See application file for complete search history.

(56) References Cited

U.S. PATENT DOCUMENTS

| | | | |
|---|---|---|---|
| 4,410,441 A | 10/1983 | Davies et al. | |
| 4,876,023 A | 10/1989 | Dickenson et al. | |
| 4,973,416 A | 11/1990 | Kennedy | |
| 5,287,961 A * | 2/1994 | Herran | 206/219 |
| 5,427,830 A | 6/1995 | Pharo | |
| 5,912,058 A * | 6/1999 | Takahashi et al. | 428/34.3 |
| 6,102,457 A * | 8/2000 | Smith | 294/1.3 |
| 6,511,723 B1 | 1/2003 | Engelaere | |
| 6,800,162 B2 | 10/2004 | Kannankeril et al. | |
| 7,424,797 B2 * | 9/2008 | Duffield | 53/453 |
| 2003/0037858 A1 | 2/2003 | Kannankeril et al. | |
| 2004/0029764 A1 | 2/2004 | Weber et al. | |
| 2004/0045842 A1 * | 3/2004 | Matsuda | B65D 75/5866 206/219 |
| 2004/0123563 A1 | 7/2004 | Inada et al. | |
| 2005/0119150 A1 | 6/2005 | Pegelow et al. | |
| 2006/0210773 A1 * | 9/2006 | Kannankeril | 428/166 |
| 2007/0251190 A1 * | 11/2007 | Daigle et al. | 53/403 |
| 2008/0048369 A1 * | 2/2008 | Kulesha | 264/571 |
| 2009/0050510 A1 * | 2/2009 | Kojima | B65D 81/052 206/522 |

FOREIGN PATENT DOCUMENTS

| | | |
|---|---|---|
| EP | 0414463 A1 | 2/1991 |
| EP | 0132726 A2 | 2/1995 |
| EP | 1 126 070 | 8/2001 |
| GB | 2187748 A | 9/1987 |
| GB | 2 362 868 | 12/2001 |
| JP | 02-155999 A | 6/1990 |
| JP | 03-119174 A | 5/1991 |
| JP | 4-48172 U | 4/1992 |
| JP | 04-151243 A | 5/1992 |
| JP | 05-214398 A | 8/1993 |
| JP | 5-94164 U | 12/1993 |
| JP | 07-002272 A | 1/1995 |
| JP | 10-235812 A | 9/1998 |
| JP | 11-199766 | 7/1999 |
| JP | 2001-010661 A | 1/2001 |
| JP | 2002-337947 A | 11/2002 |
| JP | 2004-306704 A | 11/2004 |
| JP | 2005-536584 A | 12/2005 |
| JP | 2006-192666 A | 7/2006 |
| WO | 94/29104 A | 12/1994 |

OTHER PUBLICATIONS

International Preliminary Report on Patentability dated Jan. 6, 2011 for PCT/GB2009/001545.
English translation of portion of Office Action issued in counterpart Japanese Patent Application (dated Mar. 28, 2013).
English translation of portion of Office Action issued in counterpart Japanese Patent Application (dated Mar. 5, 2014).
English translation of Office Action issued in couterrpart Chinese Patent Application (dated Jan. 14, 2013).

* cited by examiner

MULTI-CHAMBERED FLUID-FILLABLE APPARATUS

This application is the U.S. national phase of International Application No. PCT/GB2009/001545, filed 18 Jun. 2009 which designated the US and claims priority to United Kingdom Application No. 0811399.5, filed 20 Jun. 2008, the entire contents of each of which are hereby incorporated by reference.

FIELD OF THE INVENTION

The present invention relates to a multi-chambered fluid-fillable apparatus, and method of manufacture of such an apparatus, suitable for a variety of applications where protection and shock absorption is required. The invention is primarily described in relation to protective packaging, but this is just one possible application of the invention.

BACKGROUND TO THE INVENTION

There are many types of inflatable, protective packaging available. These range from pre-inflated bubble films to an extensive range of inflatable on-demand systems, which rely on machinery to inflate simple void fill bags or more sophisticated cushioning products. Other types of protective packaging include loose fill, profiled foam, vermiculite and postal products known as "Jiffy Bags".

This list of packaging products is not exhaustive, but almost all existing protective packaging solutions suffer from a common problem, which this invention seeks to address. Prior packaging solutions are largely made from petroleum based materials or composite materials and are difficult to dispose of in a satisfactory manner.

It is estimated that 56% of all packaging waste is protective packaging waste. With land fill resources diminishing and other environmental concerns, the drive for an environmentally responsible packaging solution has never been greater. While much of the petroleum based packaging can be recycled, it needs to be sorted from other waste material, and the costs involved are often prohibitive.

In recent years that has been a push to use biodegradable plastics for protective packaging. There are two principal types of biodegradable plastics; one uses a small proportion of non-oil based material, such as corn starch, the other uses photo-degradable material that breaks down when exposed to sunlight.

Unfortunately, there are a number of problems with these biodegradable plastics. One problem is that they will only degrade under specific conditions. Starch based plastics need digesters to break them up in the composting process, otherwise they will not degrade. Photo-degradable plastics clearly need light and so will not degrade in land fill sites.

Furthermore, the mixture of degradable and non-degradable plastics complicates plastics sorting systems and is a significant cost.

So, while the use of biodegradable plastics has been recognised as a solution to the waste problem, it is now recognise that current materials will only be viable when there is a corresponding, complete composting infrastructure in place.

There are also performance issues with these biodegradable plastics. The strength and barrier properties of biodegradable plastics in use for packaging are inadequate for some applications.

A further problem with existing inflated packaging is that the inflated cells will rupture at a predetermined load, resulting in an abrupt loss of cushioning. It would be desirable to be able to provide for a more gradual dissipation of load and a reduced susceptibility to rupture.

Accordingly, there is a need for an environmentally friendly protective packaging solution with improved cushioning and barrier performance.

SUMMARY OF THE INVENTION

The invention is defined in the appended claims to which reference should now be made.

Aspects of the present invention provide significant advantages. All of the physical properties of polyvinyl alcohol film are beneficial in inflatable packaging. It is water soluble and biodegradable, thus easily and safely disposed of. It has greater elasticity and tensile strength than conventionally used materials; it has excellent barrier properties for oils, odours and oxygen. It has an affinity to itself, and it is transparent, electrically dissipative and non-toxic.

BRIEF DESCRIPTION OF THE DRAWINGS

Preferred embodiments of the invention will now be described in detail with reference to the accompanying drawings, in which.

DETAILED DESCRIPTION

Figure 1A:
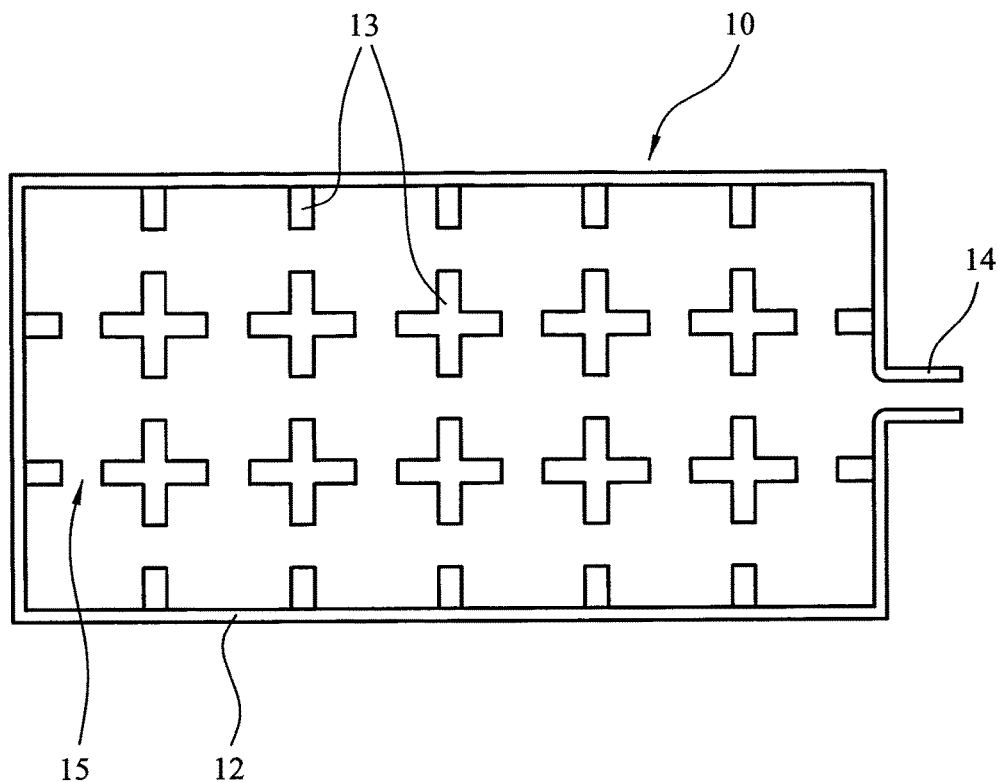
FIG. 1a is plan view of an example cushioning apparatus in accordance with the present invention.
Figure 1B:
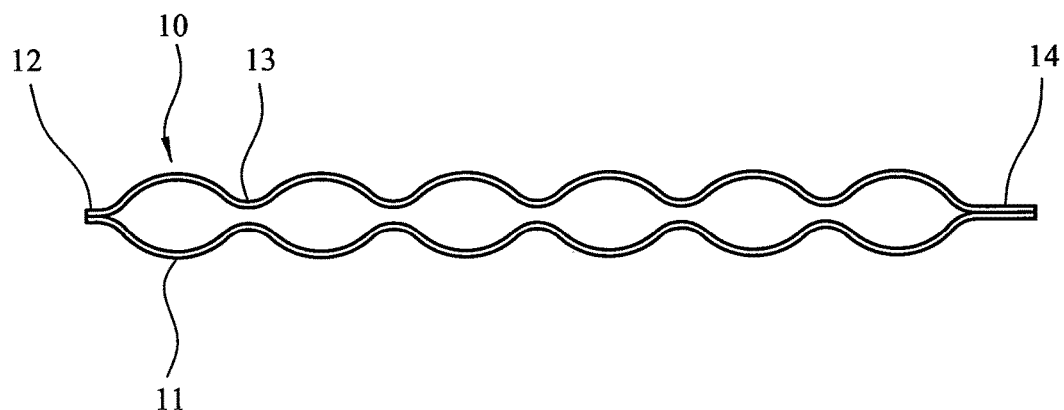
FIG. 1b is a cross-section of the apparatus of FIG. 1.

FIGS. 1a and 1b illustrate an example of an apparatus in accordance with the present invention. The apparatus shown in FIGS. 1a and 1b comprises two sheets of polyvinyl alcohol (PVOH) film bonded to one another to provide a plurality of inflatable (or already inflated) cells between them. As shown, upper sheet 10 is bonded to lower sheet 11 with a peripheral seal 12 around the circumference of each sheet. The upper and lower sheet may be formed from a single web of PVOH, so that on one side, instead of a permanent seal, there is simply be a fold line. Further bonds 13 are made between top sheet 10 and bottom sheet 11 in an interior region to define a plurality of interconnected cells. An input port 14 is provided, in a gap in the peripheral seal 12, in order to allow the cells to be inflated to provide a cushioning apparatus (or filled with another fluid or a powder). Once the cells have been inflated, the input support 14 can be sealed, as shown in FIG. 1b, so that the cells remain in an inflated condition.

The key aspect of the present invention is the use of polyvinyl alcohol film. In the example of FIGS. 1a and 1b, both upper sheet 10 and lower sheet 11 are formed from polyvinyl alcohol film. Polyvinyl alcohol offers a number of advantages. A key advantage is that PVOH is water soluble, breaking down into a carbon dioxide and water. PVOH film is also odorless and non-toxic. It has high tensile strength, extensibility, elasticity and flexibility as well providing high oxygen and aroma barrier properties. PVOH also has electrostatic dissipative properties, making it suitable for the packaging of electrical goods, and is an oil and grease barrier.

PVOH has been used for packaging goods, such as detergent for use in washing machines, where the water soluble properties of PVOH allow the detergent to be released during a wash cycle. PVOH has also been used in the packaging of certain chemicals, such as pesticides. However, PVOH has not been used in the production of inflatable or pre-inflated cushioning. However, as well as being biodegradable, the tensile strength and extensibility of PVOH make it an excellent material for making shock absorbing, inflated cushions having superior performance to existing cushioning products.

PVOH film is readily available from a number of manufacturers, in a range of grades, thicknesses and degrees of hydrolysation. Preferably, the PVOH sheets are made using the cast method, as this gives rise to more uniform and consistent films than the blown or extruded films. The PVOH films may be partly or fully alcoholised or hydrolysed. Preferably the PVOH film is formed from polyvinyl acetate film alcoholised or hydrolysed between 40% and 99%, and preferably between 70% and 92% or 70% and 90%. Details of the manufacture of PVOH film can be found in "Packaging of Pesticides and Potentially Hazardous chemicals for Consumer Use" by David Edwards, PIRA INTERNATIONAL, 1996.

The PVOH film may be unoriented, mono-axially oriented or bi-axially oriented. Warm water grades (i.e. film soluble only in warm water) are desirable for some applications where water splash could be an issue. The maximum tensile strength of the material of the PVOH film is preferably at least 20, more preferably from 30 to 80, N/mm$^2$ and may be as much as 200 N/mm$^2$ or more; and the elongation at break is preferably 200 to 380%, more preferably from 220 to 350%. Testing for these values is generally carried out at 23° C. and 50% relative humidity. The thickness of the film is preferably between 10 to 500 microns, and more preferably between 20 to 100 microns. For example, Aicello chemical companies produce a number of grades of SOLUBLON™ PVOH films which can be soluble in hot water or cold water. Thicknesses of around 40 TO 70 microns would be suitable for a cushioning apparatus in accordance with the present invention.

The PVOH film can be manufactured to hold relatively low water content. This film will act as a desiccant, making it particularly suitable for packaging items that require protection from moisture.

It is within the scope of the present invention to provide a cushioning apparatus having only a single layer of PVOH film bonded to another sheet of material, with the cells defined between them. Preferably, the other sheet of material is biodegradable, such as cardboard. The other material may be water soluble or water insoluble and may be rigid or flexible.

Figure 2:
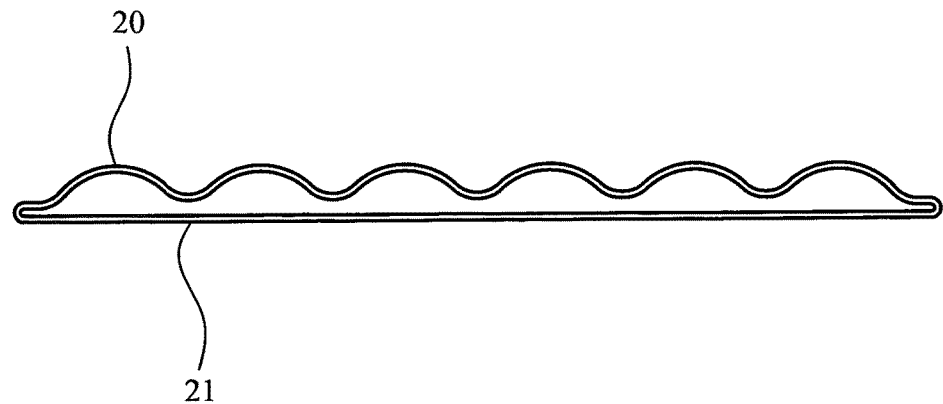
FIG. 2 is a cross-section of a further example of an apparatus in accordance with the invention.

The PVOH film or films may be laminated with other materials (again preferably biodegradable materials) or laminated to further layers of PVOH. There are a number of advantages to laminated layers of PVOH film, for example the elimination of any risk of pinholes in the film. FIG. 2 shows a cross section of an apparatus of the type shown in FIG. 1, wherein the upper layer 20, comprises laminated layers of PVOH and the lower 21 layer comprises a rigid board.

PVOH films may be sealed to one another or to other materials using a number of different techniques. For example, PVOH films may be sealed using radio frequency welding (dielectric welding), ultrasonic welding, direct thermal sealing, induction sealing, induction welding, hot wire or hot plate sealing, and impulse sealing.

However, those conventional methods of sealing PVOH films are dependent on a number of critical parameters which include humidity, and temperature, pressure and dwell time. Failure in the optimisation of any of these parameters can very easily result in a compromised seal. This has been a problem for many years in the industry. Furthermore with the methods of sealing described above, controlling the humidity is an expensive operation and is time consuming. A difference of plus or minus fifteen percent humidity can start to affect the seal parameters quite significantly. It is also important to understand that the manufacturing process of PVOH film either by the cast method or blown method requires critical control of the humidity.

PVOH films may also be sealed to one another using adhesive. In a preferred embodiment of the invention, a fully water soluble and biodegradable adhesive is used. The adhesive is applied to the water soluble film using the gravure printing process. Applying a water soluble adhesive to the film during the film's manufacturing process is highly desirable because the set up of the lines of cast PVOH film would already have gravure or other methods of printing on line. Such technology is used to laminate two layers of PVOH film. This method of producing the seals or matrix of seals has many advantages over the other methods, such as welding. During the cast manufacturing process of PVOH the film is often printed in water soluble or dispersible inks using gravure, flexo or even ink jet printing. All of these processes are capable of accurately putting down an accurate coat of ink and would be equally effective in putting down a pattern of welds/seals using a specially formulated water soluble adhesive. During the manufacturing process of the film a second layer of film is often bonded to another layer to produce a laminated film and this process can be utilised in the production of the present invention, to provide a finished cushioning product as an integral part of the films' manufacturing process. Utilising such technology would save a considerable amount of capital expenditure, as most of the overheads are already paid for to produce the film during its manufacture. A further benefit of using adhesive is that, unlike heat sealing, it does not deform or thin the film and so does not weaken the film at any point.

Turning now to the particular embodiment shown in FIG. 1a, it can be seen that the cushioning apparatus comprises a plurality of interconnected inflated or inflatable cells. Having the cells in fluid communication with one another provides a number of advantages. Firstly, the cushioning apparatus can be transported in an uninflated state and then simply inflated onsite using a single, or a few, sealable entry ports. The apparatus can also be deflated after use and will return to a planar configuration for storage before re-use. A second advantage of having the cells in fluid communication with one another is the gradual dissipation of shock. In inflated cushioning such as bubble wrap, where each of the inflated cells is isolated from the others, there is a particular internal pressure at which each isolated cell ruptures. By providing interconnection between each of the inflated cells, greater localised impacts can be withstood because the increase in internal pressure is borne by all of the interconnected cells. The use of multiple cells rather than a single, larger cavity allows for more gradual dissipation of load and allows the package to conform to particular shapes or products.

Figure 3:
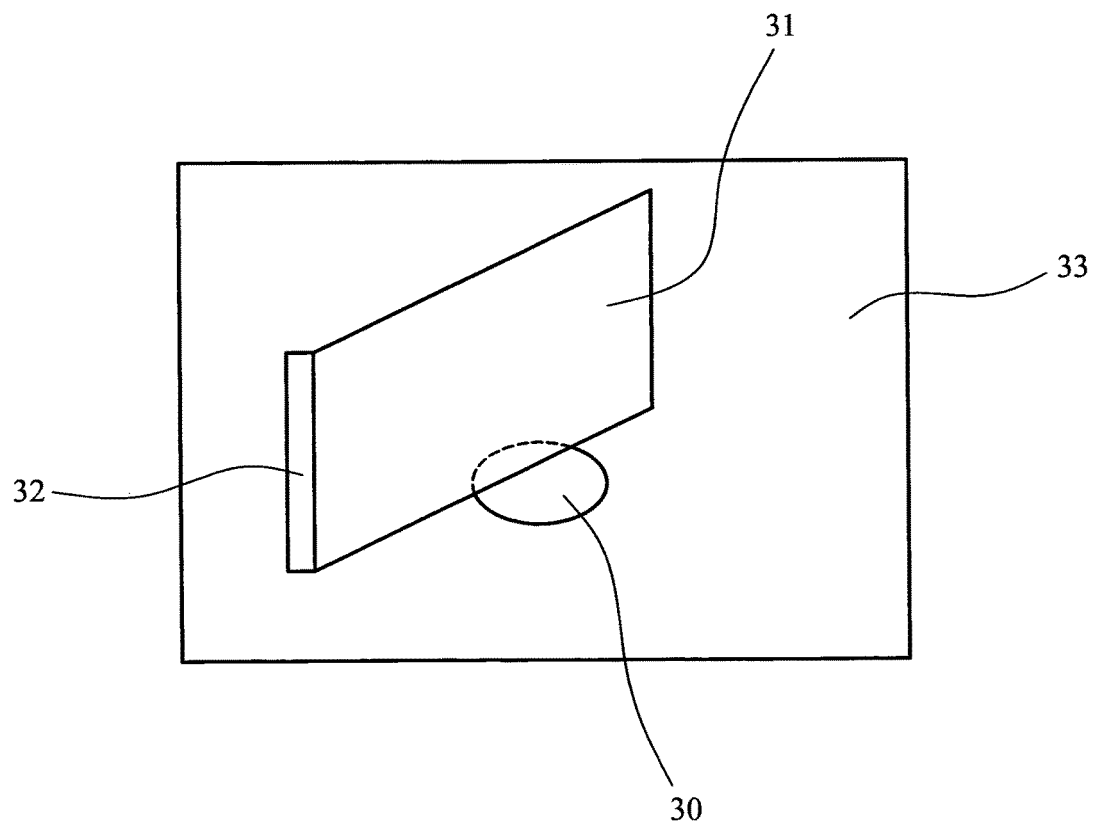
FIG. 3 illustrates an adhesive sealing patch forming part of an apparatus in accordance with the invention

As mentioned, it is possible to have a single sealable entry port 14 through which air can enter the package for inflating the cells. The package can then be sealed at the entry point either using a valve, heat seal, adhesive, or an integral adhesive patch supplied with the cushioning apparatus adjacent the entry port. An integral adhesive patch is illustrated in FIG. 3. FIG. 3 shows the entry port 30 formed in an outer surface 33 of the apparatus for inflating the apparatus and a patch 31 sealed to the outer surface 33 at one side, forming a hinge 32 adjacent the entry port 30. The patch is covered with adhesive on the surface facing the entry port and the adhesive is covered with a peelable tab. In use; once inflated, the peelable tab is removed and the patch pressed over the entry port to seal it. The tab can be attached to either the upper or the lower sheet forming the apparatus.

Alternatively, a cushioning apparatus can be provided in which not all of the cells are in fluid communication with one another and so a plurality of air entry points are provided. With this arrangement, should one of the sealable entry points fail, resulting in deflation of the cells in fluid communication with that entry point, there remain some cells that will remain fully inflated, providing some cushioning.

The cushioning apparatus can be supplied to customers in inflated form or ready for inflation by standard, table top inflation equipment. Clearly, supplying the apparatus non-inflated reduces the volume of the product and so reduces transportation costs.

As illustrated in FIG. 1*b*, with the arrangement of internal seals 13 shown in FIG. 1*a*, the inflatable cells have substantially hemispherical top and bottom surfaces when filled or inflated. It is well known that hemispherical cells of this type support greater loads than other shapes and provide for excellent impact protection. The generally square shaped cells and cross shaped internal seals 13 gives rise to the hemispherical profile of the cells.

Numerous options for the arrangement of cells are possible with the present invention, including multilayer structures in which each layer of cells may or may not be in fluid communication with the next. However, it is envisaged that for most applications a single layer of cushioning material will be sufficient.

When the cushioning apparatus is no longer required, the air or gas can be removed from it by simply puncturing one of the cells, removing a tear strip or opening the entry port. In a conventional bubble wrap this is not possible because each of the cells is isolated from one another.

The cushioning apparatus can have an area of no inflatable cavities, which facilitates the cushion being folded over onto an article to be protected. Such a construction can be fixed onto a corrugated board surface, cut and creased so that the construction wraps around fragile articles. At the end of the product's life, segregation of materials is not required, as the internal PVOH cushion is totally biodegradable as is the cardboard. In fact, PVOH is used in the re pulping process to enhance the recycling of paper and board. Existing composite constructions using board base packaging with internal polymeric protection, such as bubble wrap and profiled foam, require segregation before they can be recycled.

The size of the passages 15 connecting the inflatable cells can be chosen to suit a particular application. The narrower the passage 15, the more resistance is required for air or gas to pass from cell to cell. This, together with the amount of air or gas in the cushioning apparatus, affects the amount and type of cushioning provided by the package.

During trials using the general construction of the present invention, a number of unexpected benefits have been noted. Unlike in polyethylene based packaging cushions, the cells produced provide considerable non-abrasive grip to the articles packed, perhaps due to the elongation properties of PVOH film, which is known to have at least between five to seven greater times elongation, tensile strength and puncture resistance than like for like products. Also, when filled with air, it appears that the PVOH film envelope construction has an affinity to itself which retards air flow, resulting in more shock being dissipated that when constructed with other materials.

The present invention of making a fluid fillable multi-celled apparatus from a polyvinyl alcohol film teaches away from the current methods. The vast majority of so called "bubble wrap" film is made by thermoforming. The finished product is made by heating the bottom web of film and sucking the film into the shapes required. In doing this, the drawn cavities are inherently weaker due to thinning of the bottom section during the thermoforming process. With the present invention no thermoforming process is required, and the film thickness will remain uniform throughout. Furthermore, in the case of adhesive seals with PVOH it is known that the seal integrity is greater than that of a conventional heat seal.

Accordingly, a cushioning apparatus in accordance with the present invention, in which there are a plurality of fluidly connected inflatable cells, provides for a flexible cushioning apparatus that can be made to conform through a particular article or product whilst at the same time providing excellent cushioning properties, dissipating shock incident on a particular portion of the package through the entire cushioning apparatus.

A further aspect of the invention is the use of "sacrificial" seals in addition to permanent seals to bond the first and second sheets together. Sacrificial seals are seals that are made to break at a particular predetermined pressure, the predetermined pressure being lower than the pressure at which the permanent seals rupture of the first and second sheets rupture. The use of sacrificial seals within the interior of an inflatable cushioning apparatus provides for greater shock absorption. This is true of a PVOH cushioning apparatus in accordance with the first aspect of the invention as well as for inflatable cushioning apparatus made using conventional materials, such as polyethylene.

Figure 4:
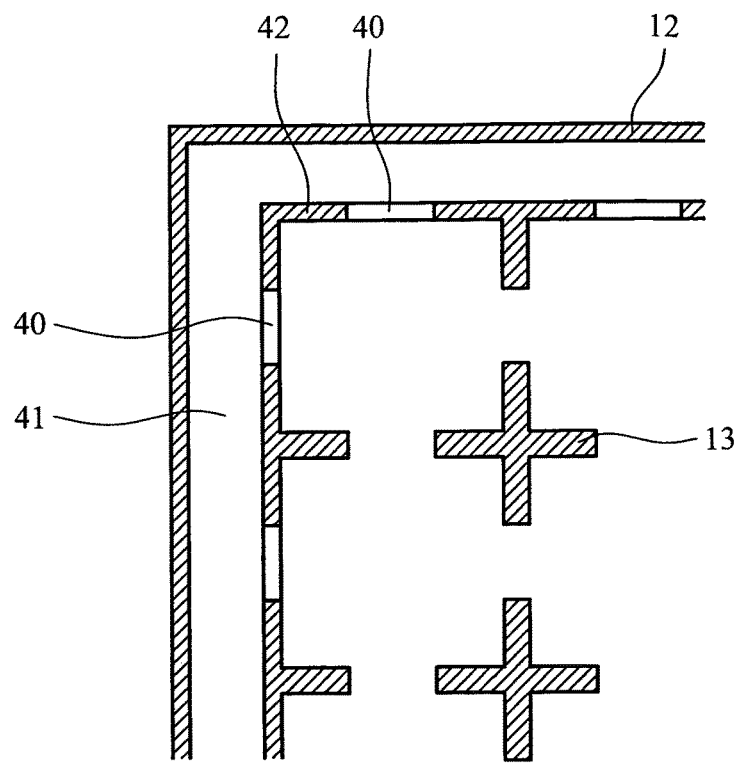
FIG. 4 illustrates the use of sacrificial seals in accordance with an example the present invention.

FIG. 4 illustrates a corner section of a cushioning apparatus of the type shown in FIG. 1, incorporating sacrificial seals. A permanent seal 12 is formed between two sheets around a periphery of the apparatus, as described with reference to FIG. 1. The permanent seal can be formed using adhesive, heat sealing or any other suitable method. Permanent interior seals 13, defining interior cells, are also formed between the upper and lower sheet, as described with reference to FIG. 1. In addition a sacrificial seal or a series of sacrificial seals 40 are formed parallel to the peripheral seal 12. As shown, the sacrificial seals are 40 formed between permanent seals 42, but a single elongate sacrificial seal can be used instead. The sacrificial seals divide the interior cells from holding chamber 41, so that in normal use the holding chamber 41 remains uninflated. However, if the internal pressure in the interior cells reaches a predetermined pressure due to an external load, at least one sacrificial seal will break, allowing air or gas from the interior cells into the holding chamber 41, thus reducing the internal pressure and dissipating the load.

The sacrificial seal or seals can be formed using heat seals that are optimised by altering the parameters of pressure, dwell time and humidity. Alternatively or in addition, a peelable adhesive that peels at a predetermined internal pressure may be used. One suitable adhesive for forming peelable seals with PVOH film is the S100 adhesive, available from Sustainable Adhesive Products, Unit 3, Swangate, Charnham Park, Hungerford, Berkshire, RG17 OYX, United Kingdom. The permanent seals can be formed using heat sealing or using adhesive, or both.

With sacrificial seals as shown in FIG. 4, not only is the cushion factor increased, but in comparison with conventional air filled packaging, more protection is provided during transport in pressurised holds found in aircraft. In such pressurised conditions conventional air filled packaging described in the art can rupture resulting in loss of cushioning. Sacrificial seals address this problem by allowing the excess compression on the cushion to breach the sacrificial seals allowing the excess air to escape into the holding reservoir.

Figure 5:
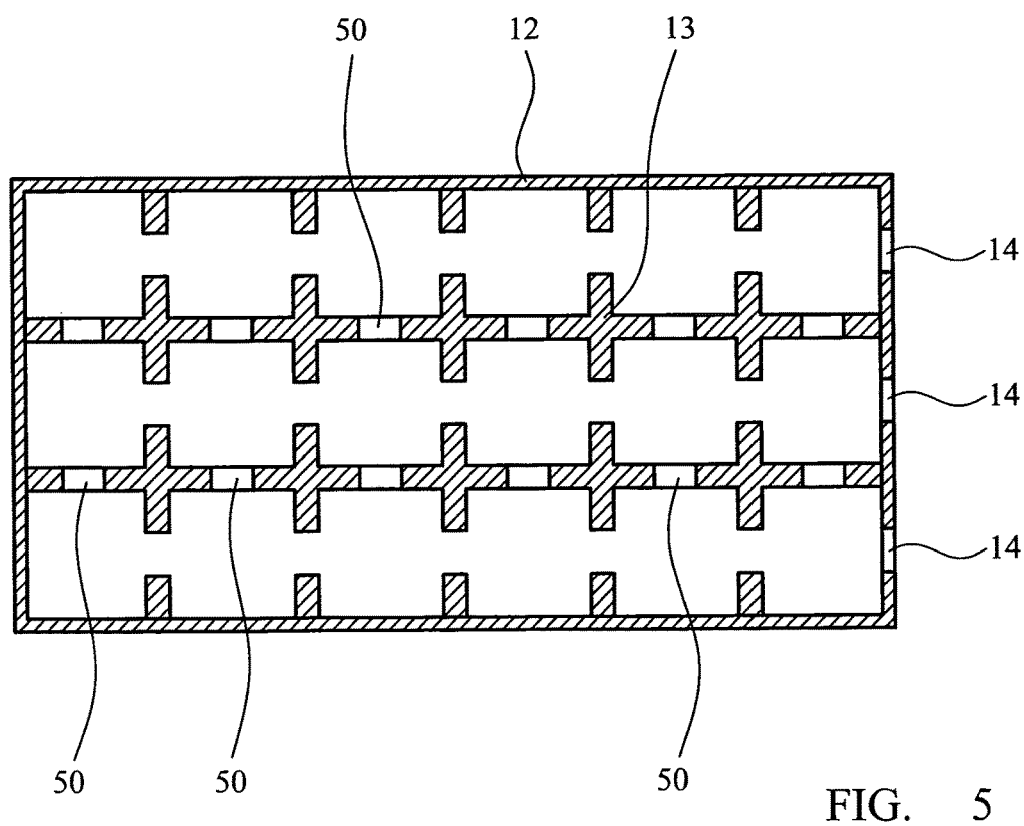
FIG. 5 illustrates a further example of the position of sacrificial seals in an apparatus in accordance with the present invention.

FIG. 5 illustrates a further embodiment of a cushioning apparatus in accordance with the present invention, using sacrificial seals. As in the embodiment of FIG. 1, a permanent peripheral seal 12 is formed between an upper and a lower sheet. A plurality of permanent interior seals 13 is also formed between the upper and lower sheet to define a plurality of cells. A plurality of sacrificial seals 50 is included, separating some cells from an adjacent cell. The sacrificial seals will rupture at a predetermined internal pressure, again providing for dissipation of shock.

With the arrangement of FIG. 5, plural input ports are required, in this case three, as not all of the cells are in fluid communication with each other. In the apparatus shown in FIG. 5, three isolated rows of cells are formed, separated by sacrificial seals, each row requiring inflation from a separate input port 14.

Each separate group of cells can be inflated to different degrees, (some may not be inflated at all providing a holding chamber similar to that illustrated in FIG. 4) allowing for variable cushioning and different rates of diffusion of gas from one to the other when a sacrificial seal 50 ruptures. The provision of separate groups of cells also ensures that some cushioning remains if one of the input ports 14 fails to seal or ruptures during use.

A cushioning apparatus in accordance with the invention can be produced with any number or pattern of cells. It may be produced pre-inflated, partially pre-inflated or not inflated at all. If not inflated, it can be provided in roll form such that desired lengths of cushioning apparatus can be cut or torn from the roll. As mentioned the first and second layers may be laminated and may be formed of different material to one another.

A cushioning apparatus in accordance with the present invention can be used in a number of applications, such as postal envelopes, for use as void fill packaging for shipping fragile goods, in protective clothing or any application in which protection from external load is required.

Figure 6:
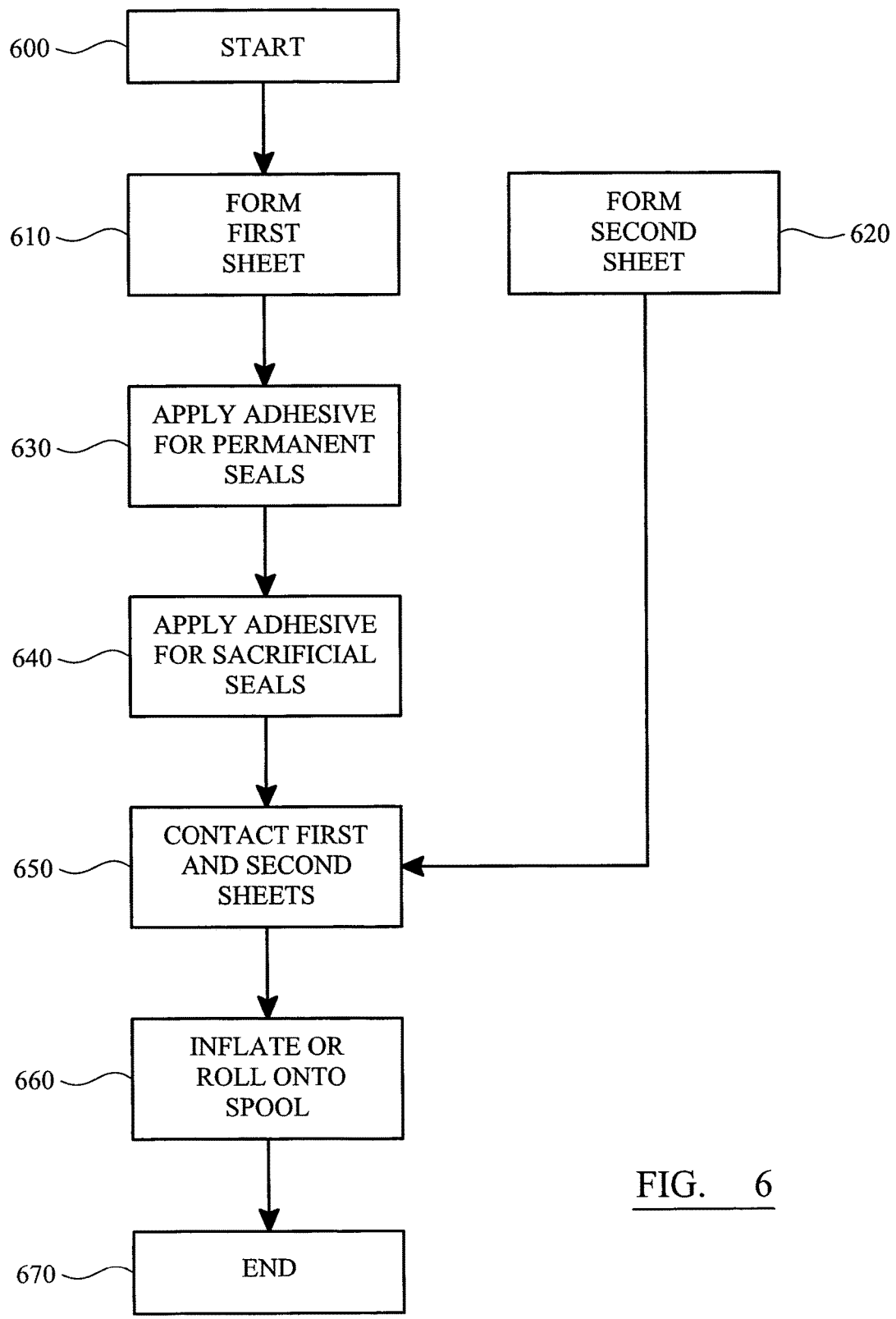
FIG. 6 illustrates a process for producing a cushioning apparatus in accordance with the present invention.

FIG. 6 is a flow diagram illustrating the steps in manufacturing an apparatus in accordance with preferred embodiment of the invention. The process starts at step 600. The first sheet is formed at step 610. This is preferably a cast sheet of polyvinyl alcohol, formed from partly or fully hydrolysed polyvinyl acetate, as previously described. The second sheet is formed at step 620. The second sheet is preferably a cast sheet of polyvinyl alcohol, formed from partly or fully hydrolysed polyvinyl acetate, as previously described. However, either the first or the second sheet may be formed from a different material and either or both may be formed using a different method. At step 630, adhesive is printed onto the first sheet for forming permanent seals, including a peripheral seal. At step 640 adhesive for the non-permanent or "sacrificial" seals is printed onto the first sheet. This may be done as a separate step to step 630 or at the same time. The first and second sheets are then pressed together at step 650 to form the seals. After the adhesive is set, the cushioning apparatus is complete and may, at step 660, be rolled or folded ready for inflation on site, or may be pre-inflated prior to shipping.

Figure 7A:
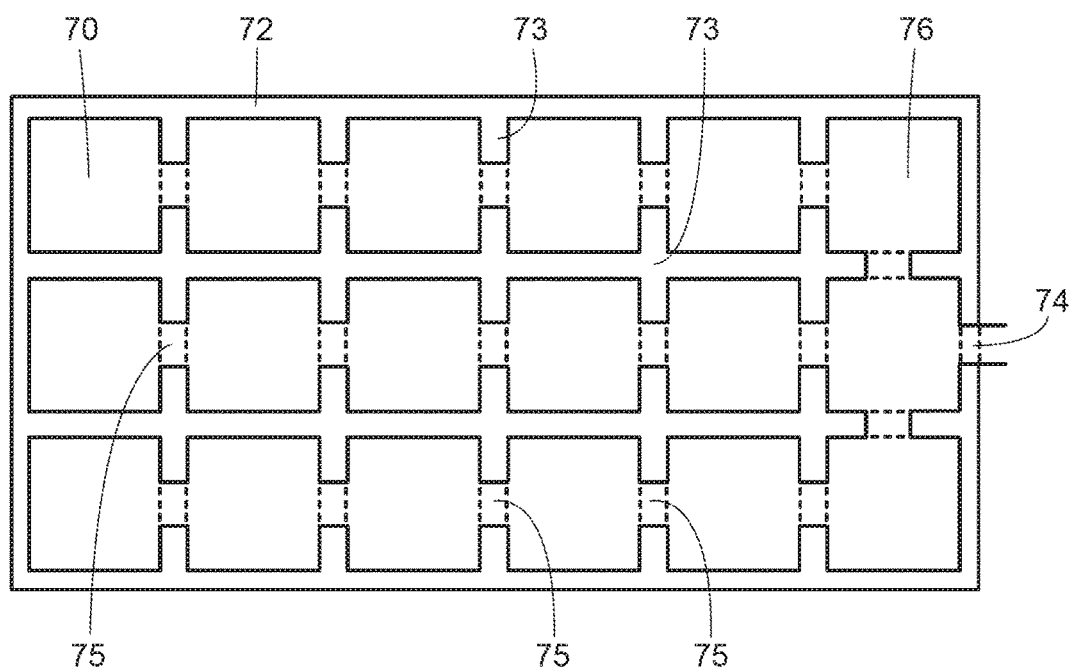
FIG. 7A illustrates an apparatus in accordance with the invention, suitable for use in a method of forming individual fluid filled packages.
Figure 7B:
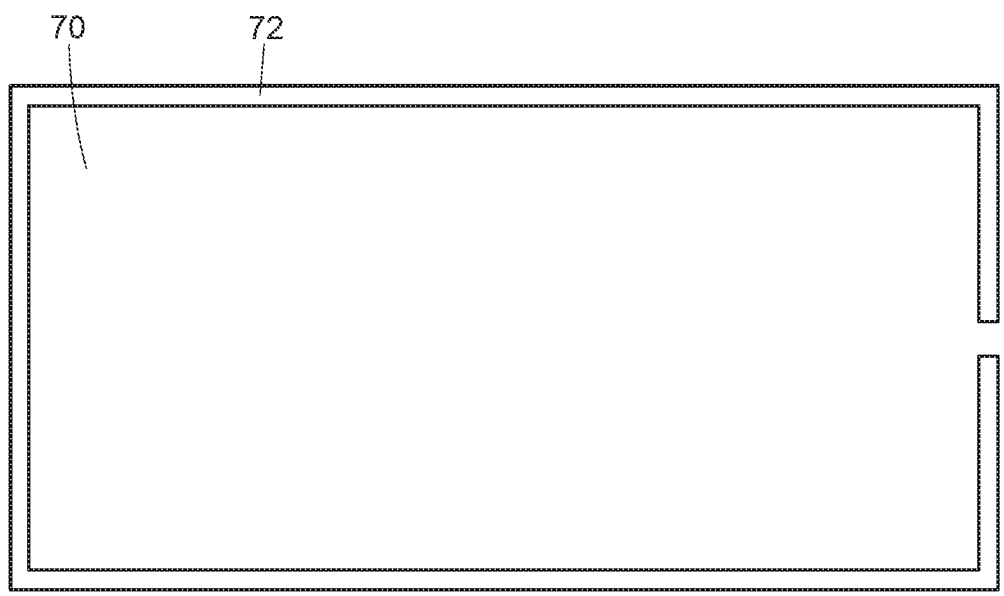
FIG. 7B illustrates in intermediate construction of the apparatus in FIG. 7A where an upper sheet is bonded to a lower sheet along a peripheral seal.
Figure 7C:
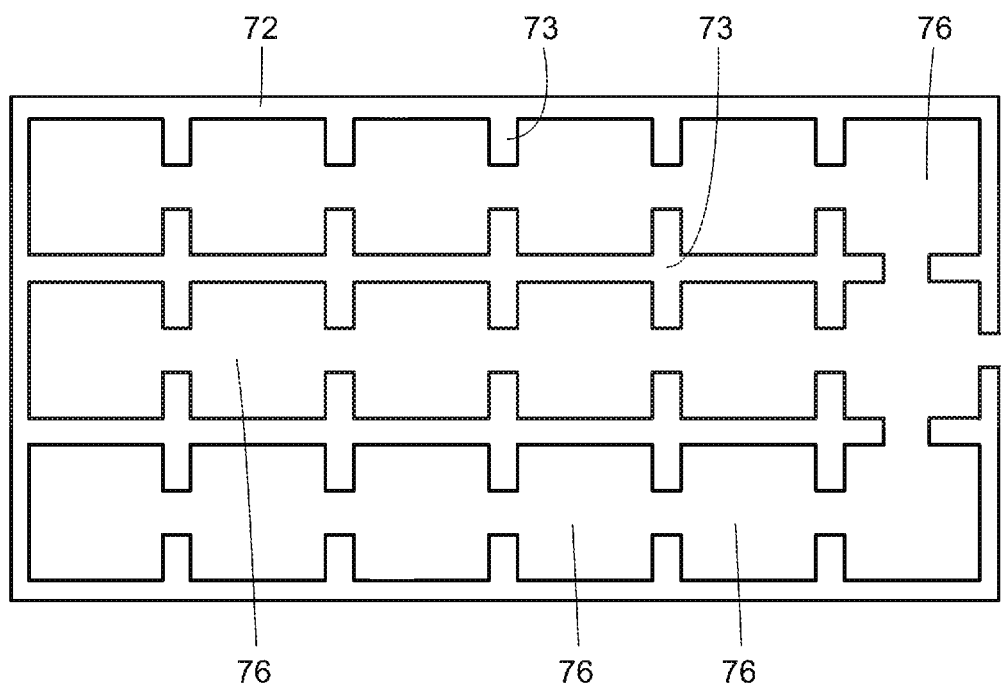
FIG. 7C illustrates another intermediate construction of the apparatus in FIG. 7A where further bonds are made between the upper sheet and the lower sheet.
Figure 7D:
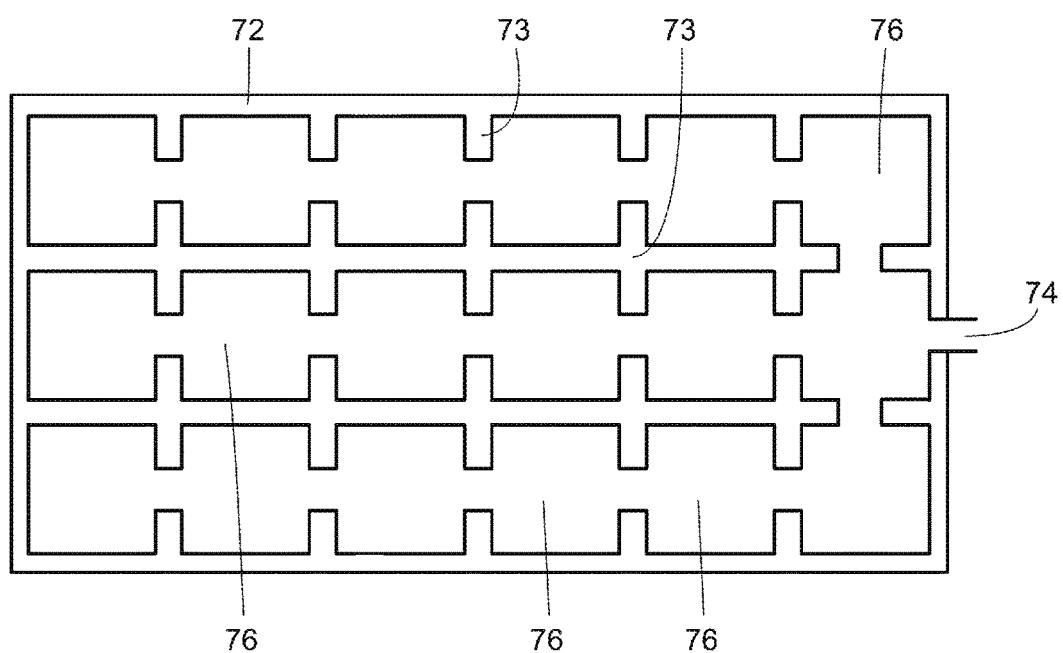
FIG. 7D illustrates another intermediate construction of the apparatus in FIG. 7A showing an input port that allows filling of the cells.
Figure 7E:
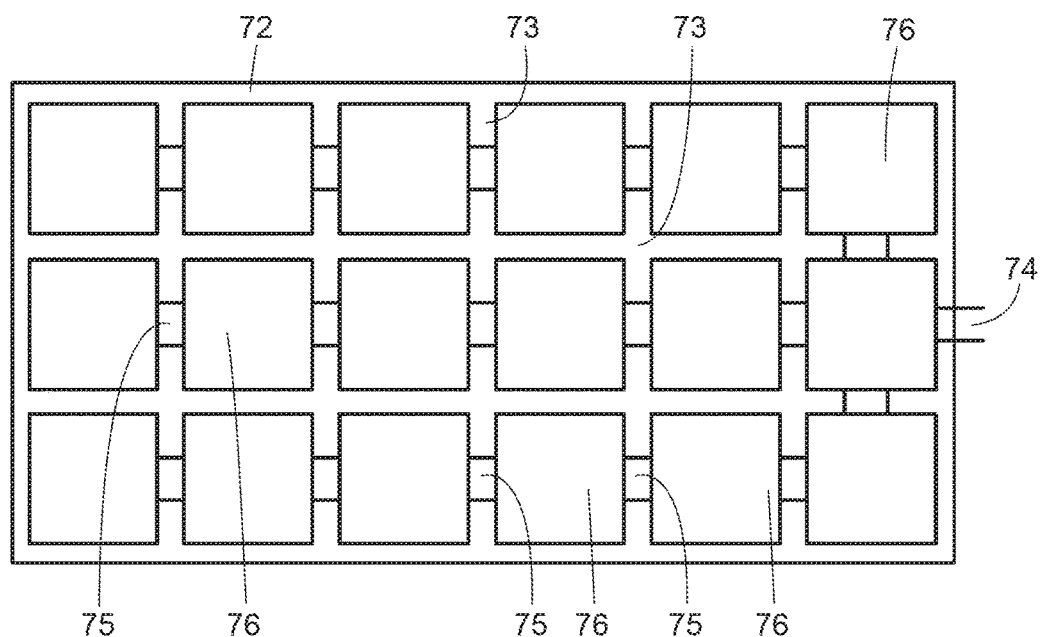
FIG. 7E illustrates another intermediate construction of the apparatus in FIG. 7A showing further seals formed at unbonded periphery regions of the cells to isolate the cells.

Another application of the present invention is in the production of fluid or powder filled packages, particularly where water solubility of the package is required, as with detergents. FIG. 7A shows a package useful for forming individual fluid or powder filled packages, as a composite of intermediate structures and structures with additional seals 75 shown in dotted line. As with the embodiment shown in FIG. 1, the package comprises two sheets of polyvinyl alcohol (PVOH) film bonded to one another to provide a plurality of fillable cells between them. As shown in FIG. 7B, upper sheet 70 is bonded to lower sheet (not shown) with a peripheral seal 72 around the circumference of each sheet. The upper and lower sheet may be formed from a single web of PVOH, so that on one side, instead of a permanent seal, there is simply a fold line. As shown in FIG. 7C, further bonds 73 are made between top sheet 70 and bottom sheet (not shown) in an interior region to define a plurality of interconnected cells 76. Each cell 76 has a bonded periphery defined by seals 72 and/or 73. As shown in FIG. 7D input port 74 is provided, in a gap in the peripheral seal 72, in order to allow the cells to be filled with fluid or powder. A desired volume of fluid, such as liquid detergent, can be pumped into the package via input port 74. Input port 74 can then be sealed to retain the fluid. Further seals 75, shown in dotted line in FIG. 7A and solid lines in FIG. 7E, can then be formed between the cells to isolate them from one another, so that a plurality of filled and sealed cells 76a is formed. The cells 76a can then be separated from one another by cutting or tearing along the seals between the cells.

Although the embodiment of FIG. 7 uses a PVOH package, any suitable combination of materials may be used in this method. PVOH has the advantage that it is water soluble, but other materials may be suitable for specific applications.

Another aspect of the invention is therefore a method for producing a plurality of fluid or powder filled packages, comprising the steps of: providing a first package comprising a first sheet bonded to a second sheet to provide a plurality of interconnected fluid fillable chambers and an input port providing access to the chambers, filling the chambers with a predetermined volume of the fluid or powder; and forming seals between the chambers and the across the input port to provide a plurality of sealed fluid or powder filled chambers.

The use of an apparatus in accordance with the present invention in this way provides a simpler and cheaper method to form individual dosed packages of fluid or powder than current methods. Current methods require thermoforming cavities and individual filling of the cavities.

The invention claimed is:

1. A fluid filled apparatus, comprising a first flexible sheet bonded to a second sheet in a periphery around the sheets and said sheets selectively bonded together in an interior region to define a plurality of interconnected fluid filled cells filled with liquid detergent between the sheets, said first and second sheets are planar and each of said first and second sheets has a substantially uniform thickness of at least 40 microns, and wherein said first and second sheets are formed substantially from polyvinyl alcohol which is polyvinyl acetate that is hydrolysed or alcoholised between 40% and 99%, are water soluble and the first and second sheets are elastic, and wherein the first and second sheets are bonded to one another using an adhesive.

2. An apparatus according to claim 1, wherein at least one of the first sheet and the second sheet is formed substantially from cast polyvinyl alcohol.

3. An apparatus according to claim 1, wherein at least one of the first sheet and the second sheet is formed solely from polyvinyl alcohol.

4. An apparatus according to claim 1, wherein at least one of the first sheet and the second sheet is formed substantially from polyvinyl acetate that is hydrolysed or alcoholised between 70% and 92%.

5. An apparatus according to claim 1, wherein at least one of the first sheet and the second sheet is laminated with further sheets of polyvinyl alcohol.

6. An apparatus according to claim 1, wherein each of the fluid filled cells has, when filled, a substantially hemispherical outer surface.

7. An apparatus according to claim 1, wherein the first and second flexible sheets have a substantially uniform thickness of between 40 and 70 microns.

8. An apparatus according to claim 1, further comprising at least one input aperture and a self-adhesive patch sealing the at least one input aperture.

9. An apparatus according to claim 1, wherein the adhesive is biodegradable.

* * * * *